United States Patent
Lee et al.

(10) Patent No.: US 9,432,985 B2
(45) Date of Patent: Aug. 30, 2016

(54) METHOD FOR SETTING SEARCH REGION TO DETECT DOWNLINK CONTROL CHANNEL IN WIRELESS COMMUNICATION SYSTEM AND APPARATUS FOR SAME

(71) Applicant: LG ELECTRONICS INC., Seoul (KR)

(72) Inventors: Seungmin Lee, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 27 days.

(21) Appl. No.: 14/374,461

(22) PCT Filed: Feb. 28, 2013

(86) PCT No.: PCT/KR2013/001643
§ 371 (c)(1),
(2) Date: Jul. 24, 2014

(87) PCT Pub. No.: WO2013/129870
PCT Pub. Date: Sep. 6, 2013

(65) Prior Publication Data
US 2014/0362758 A1 Dec. 11, 2014

Related U.S. Application Data

(60) Provisional application No. 61/605,744, filed on Mar. 1, 2012.

(51) Int. Cl.
*H04W 72/04* (2009.01)
*H04L 5/00* (2006.01)
*H04L 5/14* (2006.01)
(Continued)

(52) U.S. Cl.
CPC .......... *H04W 72/042* (2013.01); *H04L 5/0037* (2013.01); *H04L 5/0048* (2013.01); *H04L 5/0053* (2013.01); *H04L 5/1469* (2013.01); *H04L 27/2607* (2013.01); *H04W 4/06* (2013.01)

(58) Field of Classification Search
None
See application file for complete search history.

(56) References Cited

U.S. PATENT DOCUMENTS

| | | | | |
|---|---|---|---|---|
| 8,873,486 | B2* | 10/2014 | Moulsley | H04L 5/0091 370/329 |
| 2010/0281323 | A1* | 11/2010 | Wang | H04B 7/15507 714/748 |
| 2011/0103321 | A1* | 5/2011 | Nishio | H04W 72/042 370/329 |

(Continued)

OTHER PUBLICATIONS

Lg Electronics, "Overall design of additional carrier types", 3GPP Tsg Ran WG1 #67, Agenda Item 7.2.2, San Francisco, Usa, Nov. 14-18, 2011, 7 pp., R1-113974.

(Continued)

*Primary Examiner* — Khaled Kassim
*Assistant Examiner* — Zhaohui Yang
(74) *Attorney, Agent, or Firm* — Birch, Stewart, Kolasch & Birch, LLP

(57) ABSTRACT

In the present application, disclosed a method for a terminal setting a search region for a downlink channel in a wireless communication system. More specifically, the method comprises the steps of receiving from a base station information related to a starting symbol of the search region by way of upper layer signaling; setting the search region by using the information related to the starting symbol; and receiving the downlink control channel by performing blind coding on the search region, wherein the starting symbol of the search region changes according to the characteristic of a subframe which receives the downlink control channel.

11 Claims, 10 Drawing Sheets

(51) Int. Cl.
*H04L 27/26* (2006.01)
*H04W 4/06* (2009.01)

(56) References Cited

U.S. PATENT DOCUMENTS

| | | | |
|---|---|---|---|
| 2011/0170458 A1* | 7/2011 | Chen | H04B 7/2606 370/279 |
| 2012/0034945 A1 | 2/2012 | Wang | |
| 2012/0039283 A1 | 2/2012 | Chen et al. | |
| 2012/0044821 A1 | 2/2012 | Kim et al. | |
| 2013/0039284 A1* | 2/2013 | Marinier | H04L 5/001 370/329 |
| 2013/0044664 A1* | 2/2013 | Nory | H04L 1/0045 370/311 |
| 2013/0094458 A1* | 4/2013 | Sartori | H04W 72/042 370/329 |
| 2013/0163543 A1* | 6/2013 | Freda | H04W 72/0406 370/329 |
| 2014/0044071 A1* | 2/2014 | Piggin | H04L 5/0096 370/329 |

OTHER PUBLICATIONS

Lg Electronics, "Resource Configuration for E-Pdcch based Ss", 3GPP Tsg WG1 Meeting #68, Agenda Item: 7.6.3, Dresden, Germany, Feb. 6-10, 2012, 4 pp., R1-120452.

* cited by examiner

FIG. 2
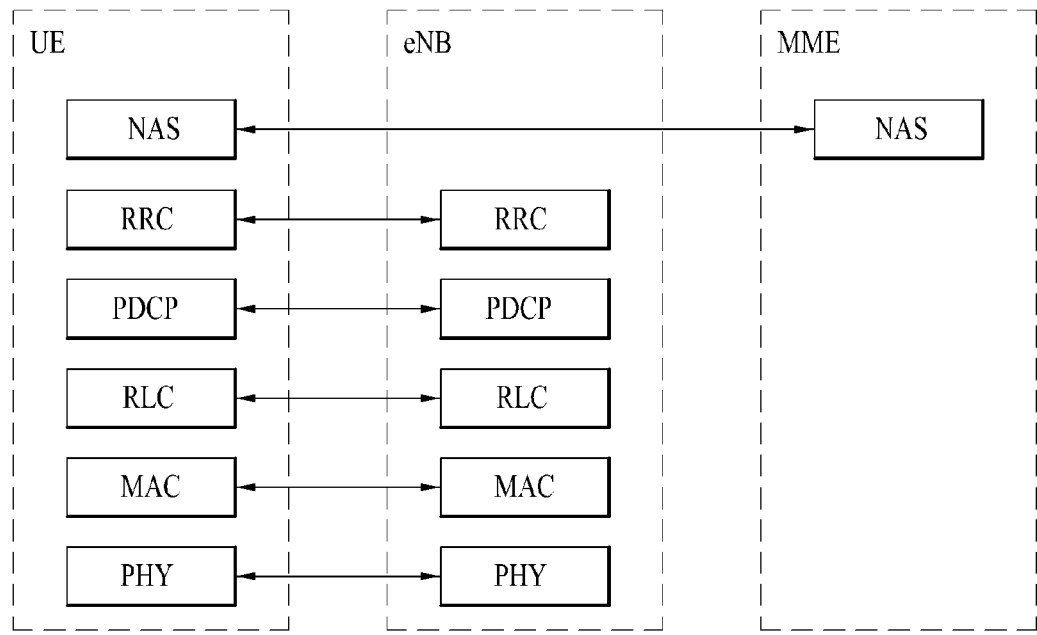
(a) contol - plane protocol stack
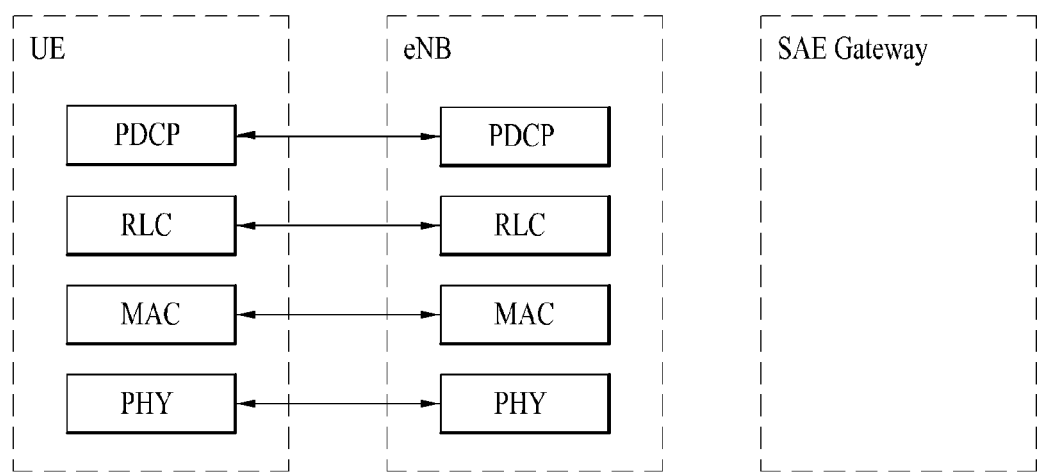
(b) user - plane protocol stack FIG. 5
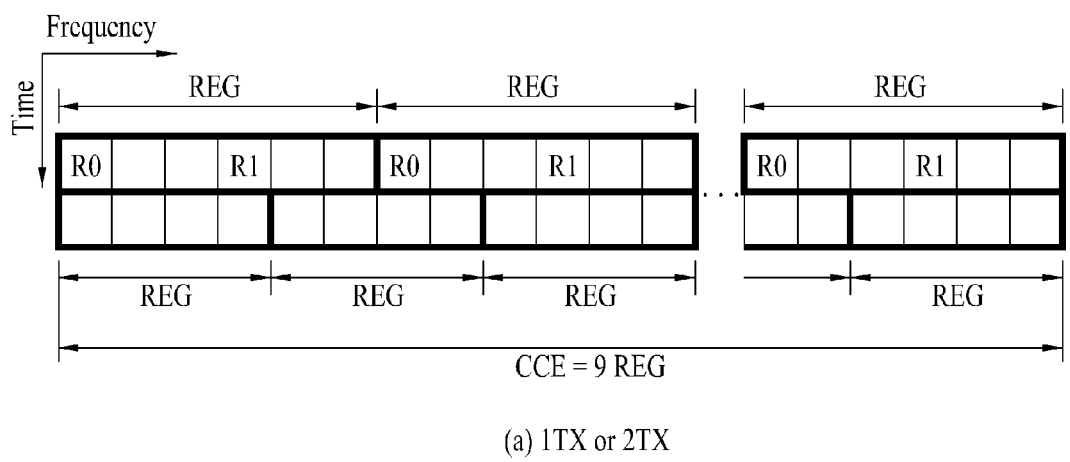
(a) 1TX or 2TX
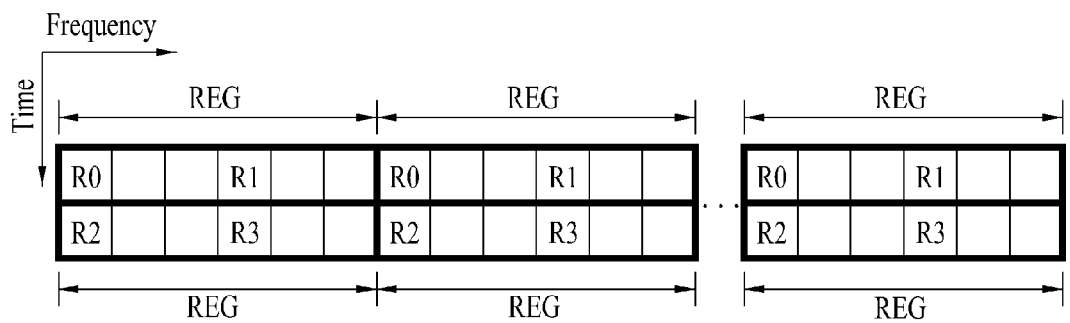
(b) 4 TX

METHOD FOR SETTING SEARCH REGION TO DETECT DOWNLINK CONTROL CHANNEL IN WIRELESS COMMUNICATION SYSTEM AND APPARATUS FOR SAME

CROSS REFERENCE TO RELATED APPLICATIONS

This application is the National Phase of PCT International Application No. PCT/KR2013/001643, filed on Feb. 28, 2013, which claims priority under 35 U.S.C. 119(e) to U.S. Provisional Application No. 61/605,744, filed on Mar. 1, 2012, all of which are hereby expressly incorporated by reference into the present application.

TECHNICAL FIELD

The present invention relates to a wireless communication system, and more particularly, to a method of setting a search space to detect a downlink control channel in a wireless communication system and an apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method of setting a search space to detect a downlink control channel in a wireless communication system and an apparatus therefor in the following description based on the discussion mentioned earlier in the foregoing description.

Technical Solution

To achieve these and other advantages and in accordance with the purpose of the present invention, as embodied and broadly described, according to one embodiment, a method of setting a search space, which is set by a user equipment to detect a downlink control channel in a wireless communication system, includes the steps of receiving information on a starting symbol of the search space from an eNode B via upper layer signaling, setting the search space using the information on the starting symbol and receiving the downlink control channel by performing blind decoding on the search space, wherein the starting symbol of the search space changes according to a characteristic of a subframe in which the downlink control channel is received.

Preferably, if the subframe corresponds to an MBSFN (multicast broadcast single frequency network) subframe, the starting symbol of the search space is located at a more front end of the starting symbol of the search space compared to a case that the subframe corresponds to a non-MBSFN subframe. Additionally, if the subframe corresponds to the MBSFN subframe, the starting symbol of the search space may change according to the number of antenna port of a cell-specific reference signal received in the subframe.

And, the starting symbol of the search space changes according to whether a positioning reference signal is transmitted in the subframe. Or, the starting symbol of the search space may change according to the number of symbol configured for the purpose of downlink in the subframe. And, the starting symbol of the search space may change according to whether a downlink bandwidth assigned to the user equipment is greater than a threshold value.

Meanwhile, the method further includes the step of receiving a control format indicator channel including information on the number of resource block in which the search space is configured from the eNode B.

More preferably, the search space is configured from the starting symbol to a last symbol of the subframe.

Moreover, if the subframe is received on an extension carrier where a legacy downlink control channel is not received, the starting symbol of the search space is configured by a first symbol of the subframe.

In this case, the downlink control channel is demodulated using a UE-specific reference signal.

Advantageous Effects

According to embodiment of the present invention, it is able to more efficiently set a search space for a user equipment to detect a downlink control channel in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram for structures of control and user planes of radio interface protocol between a 3GPP radio access network standard-based user equipment and E-UTRAN;

FIG. 5 is a diagram for a resource unit used for configuring a downlink control channel in LTE system;

BEST MODE MODE FOR INVENTION

Figure 1:
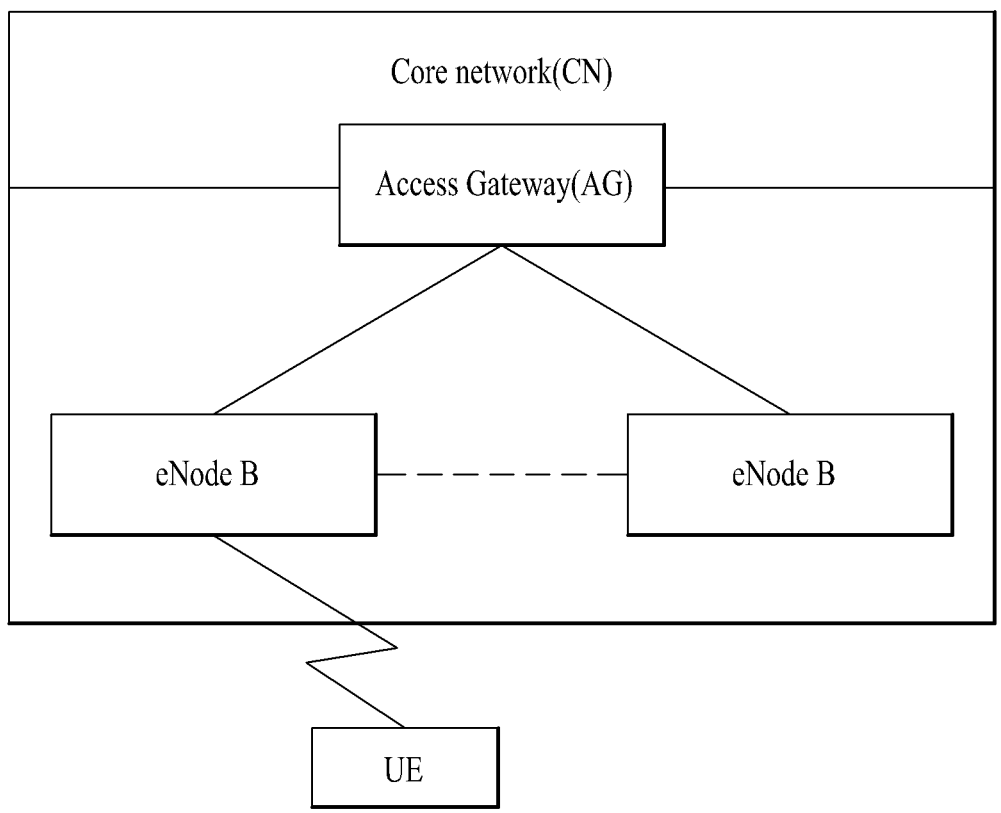
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
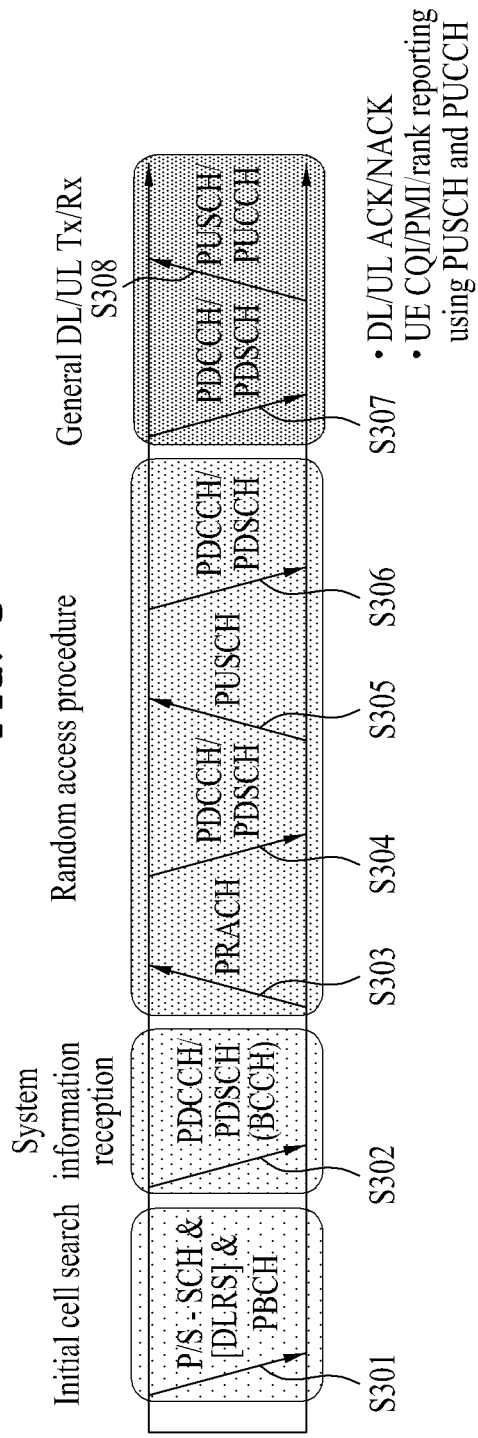
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
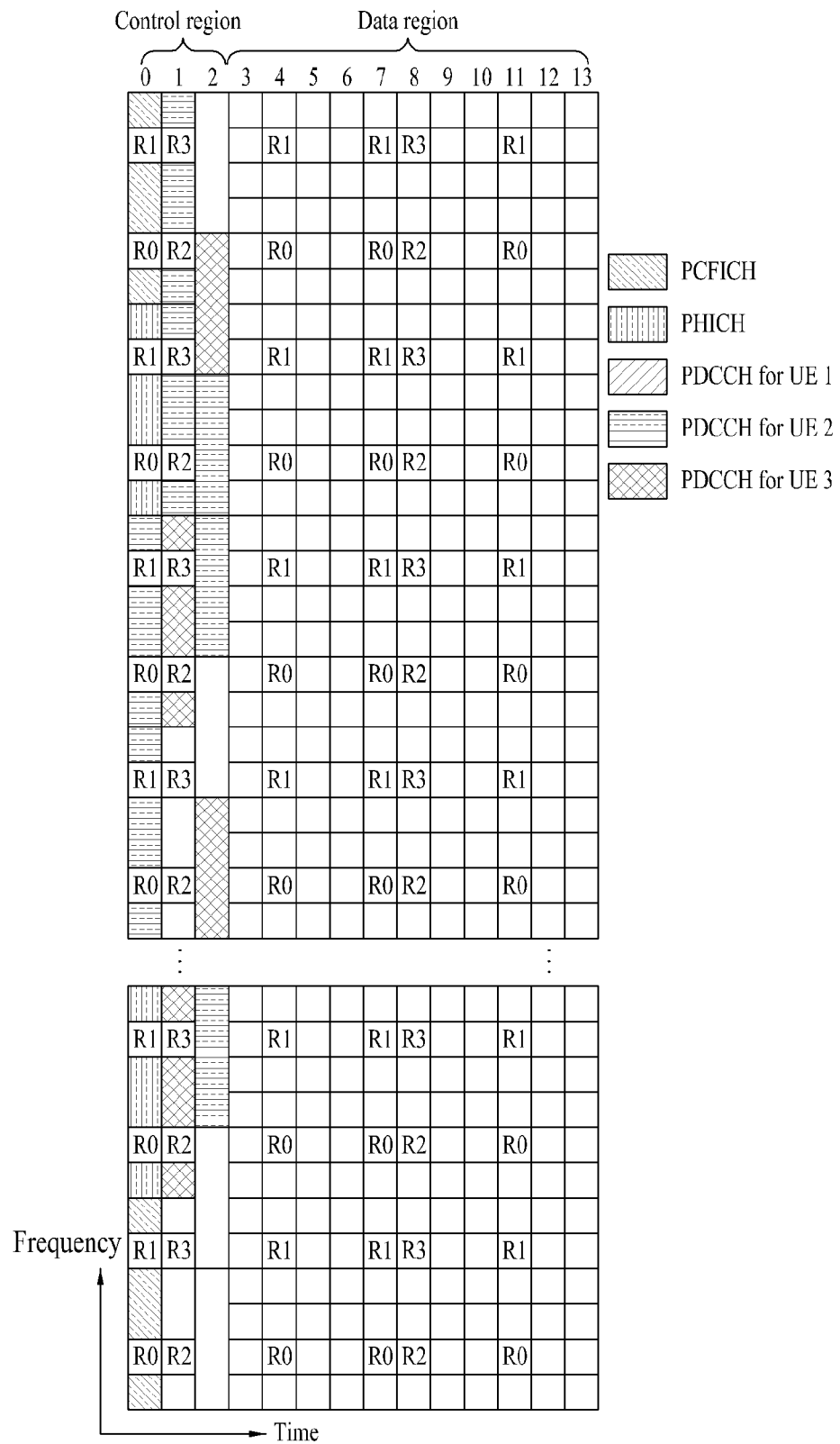
FIG. 4 is a diagram for a structure of a downlink radio frame in LTE system.

FIG. 4 is a diagram for showing an example of a control channel included in a control region of a single subframe in a DL radio frame.

Referring to FIG. 4, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

FIG. 5 is a diagram of a resource unit used for constructing a downlink control channel in LTE system. In particular, FIG. 5 (a) indicates a case that the number of transmitting antennas of an eNode B corresponds to 1 or 2 and FIG. 5 (b) indicates a case that the number of transmitting antennas of the eNode B corresponds to 4. A reference signal (RS) pattern varies according to the number of transmitting antennas but a method of configuring a resource unit in relation to a control channel is identical irrespective of the number of transmitting antennas.

Referring to FIG. 5, a base resource unit of a downlink control channel is a REG (resource element group). The REG consists of 4 neighboring resource elements except an RS. The REG is represented in the drawing with a bold line. The PCFICH and the PHICH include 4 REGs and 3 REGs, respectively. The PDCCH consists of a CCE (control channel element) unit and one CCE includes 9 REGs.

In order for a UE to check whether the PDCCH consisting of L number of CCEs is transmitted to the UE, the UE is configured to check the CCEs contiguously arranged by $M^{(L)}(\geq L)$ number of CCEs or a specific rule. A value of the L, which should be considered for the UE to receive the PDCCH, may become a plural number. The UE should check CCE aggregations to receive the PDCCH. The CCE aggregations are called a search space. As an example, the search space is defined by LTE system as Table 1 in the following.

TABLE 1

| Type | Search space $S_k^{(L)}$ Aggregation level L | Size [in CCEs] | Number of PDCCH candidates $M^{(L)}$ | DCI formats |
|---|---|---|---|---|
| UE-specific | 1 | 6 | 6 | 0, 1, 1A, 2B, 1D, 2, 2A, 2B, 4 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

In this case, CCE aggregation level L indicates the number of CCE consisting of PDCCH, $S_k^{(L)}$ indicates a search space of the CCE aggregation level L and $M^{(L)}$ indicates the number of candidate PDCCHs monitored in the search space of the aggregation level L.

The search space can be classified into a UE-specific search space accessible by a specific UE only and a common search space accessible by all UEs in a cell. A UE monitors the common search space of which the CCE aggregation level corresponds to 4 and 8 and monitors the UE-specific search space of which the CCE aggregation level corresponds to 1, 2, 4, and 8. The common search space and the UE-specific search space may overlap with each other.

And, a position of a first (having a smallest index) CCE in a PDCCH search space, which is given to a random UE for each CCE aggregation level value, varies in every subframe depending on a user equipment. This is called a PDCCH search space hashing.

The CCE can be distributed to a system band. More specifically, a plurality of CCEs, which are logically contiguous, can be inputted to an interleaver. The interleaver performs a function of mixing a plurality of the CCEs with each other in REG unit. Hence, frequency/time resources forming a CCE are physically distributed in the total frequency/time domain within a control region of a subframe. Consequently, although a control channel is constructed in a CCE unit, the interleaving is performed in an REG unit. Hence, frequency diversity and interference randomization gain can be maximized.

Figure 6:
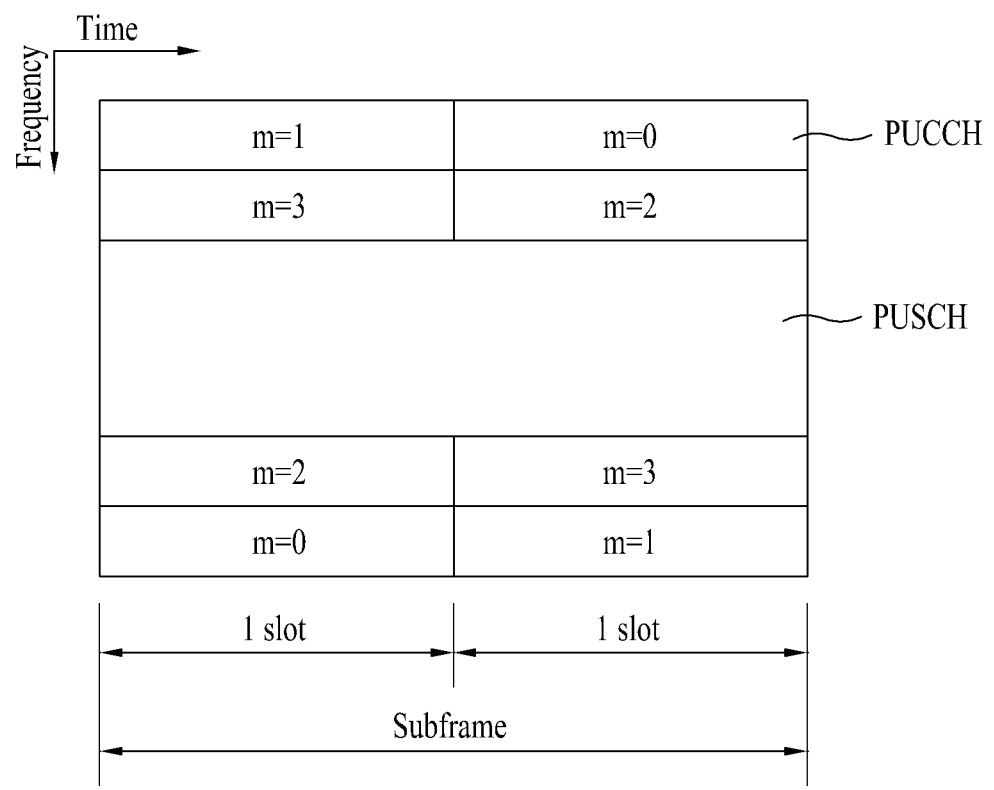
FIG. 6 is a diagram for a structure of an uplink radio frame in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 7 shows an example that the PUCCHs satisfying conditions (e.g., m=0, 1, 2, 3) are assigned to a subframe.

Figure 7:
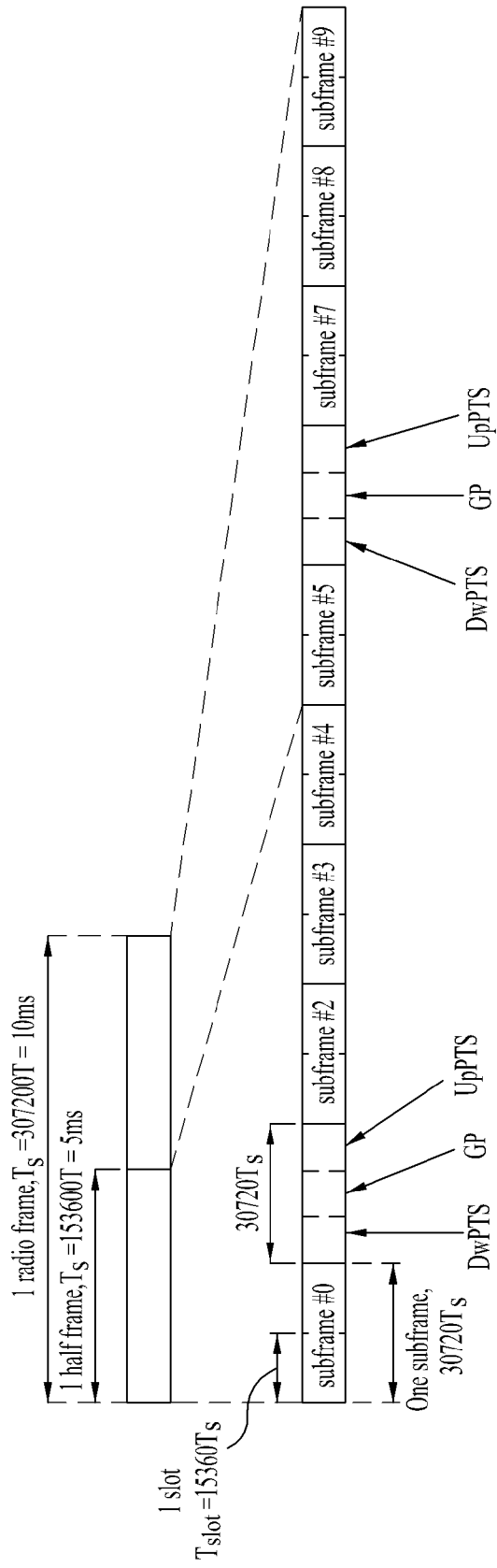
FIG. 7 is a diagram for an example of a structure of a radio frame in LTE TDD system.

FIG. 7 is a diagram for an example of a structure of a radio frame in LTE TDD system. In LTE TDD system, a radio frame includes two half frames. Each of the half frames includes 4 normal subframes including 2 slots, respectively and a special subframe including DwPTS (downlink pilot time slot), GP (guard period) and UpPTS (uplink pilot time slot). The DwPTS is used for initial cell search, synchronization or channel estimation in a user equipment.

The UpPTS is used for channel estimation in a base station and uplink transmission synchronization of the user equipment. In particular, the DwPTS is used for DL transmission and the UpPTS is used for UL transmission. In particular, the UpPTS is utilized to transmit a PRACH preamble or an SRS. The guard period is a period for eliminating interference generated in uplink due to multipath delay of a downlink signal between uplink and downlink.

Regarding the special subframe, configuration of the special subframe is defined by a current 3GPP standard document as Table 2 in the following. Referring to Table 2, in case of $T_s=1/(15000\times2048)$, it indicates the DwPTS and the UpPTS and a remaining region is configured as the guard period.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In the meantime, Table 3 in the following shows UL/DL configuration in LTE TDD system.

TABLE 3

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 3, 'D' indicates a DL subframe, 'U' indicates a UL subframe and 'S' indicates a special subframe. Table 2 also shows a DL-UL switching period in the UL/DL subframe configuration in each system.

As various devices requiring M2M (machine-to-machine) communication and high data transmission capacity are emerged and disseminated, data requisites for a cellular network are rapidly increasing in a current wireless communication environment. In order to satisfy high data requisite, communication technologies are developing to a carrier aggregation technology for efficiently using more frequency bands, a multi-antenna technology used for increasing data capacity in a limited frequency, a multi-base station cooperation technology, and the like and the communication environment is evolving in a manner that density of an accessible node is growing in the vicinity of a user. A system equipped with the node of high density may have higher system performance by means of cooperation between nodes. Compared to a node operating as an independent base station (a base station (BS), an advanced BS (ABS), a Node-B (NB), an eNode-B (eNB), an access point (AP), and the like) without cooperation, the aforementioned scheme may have superior performance.

Figure 8:
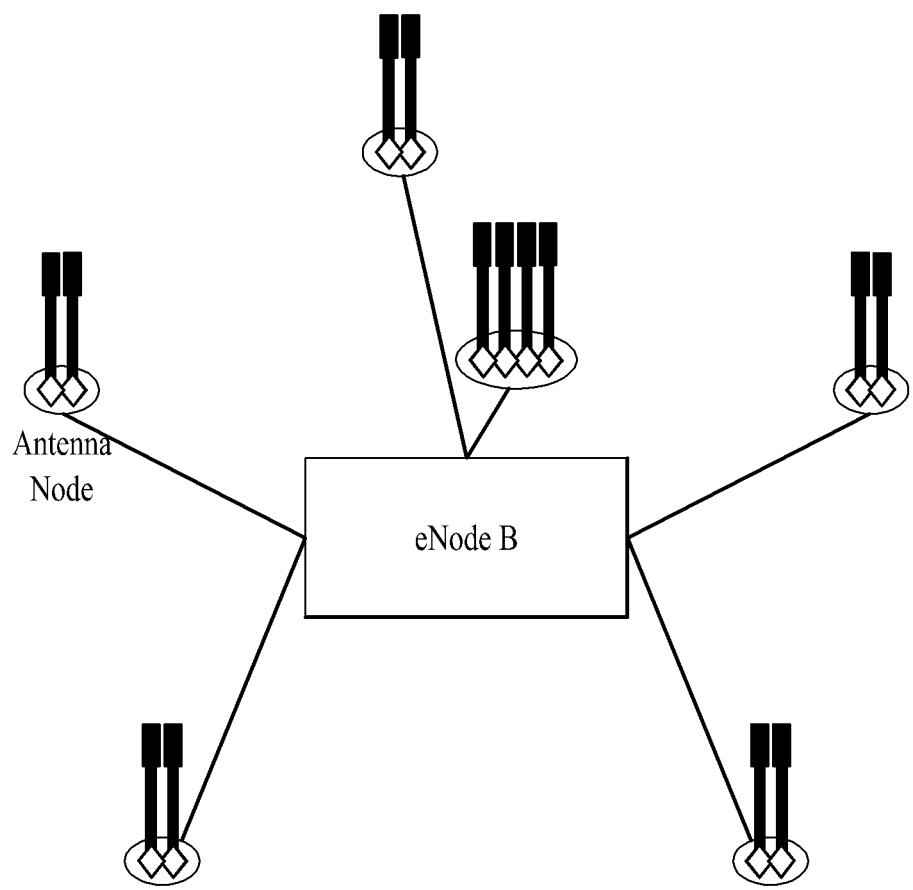
FIG. 8 is a diagram for an example of a multi node system in a next generation communication system.

FIG. 8 is a diagram for an example of a multi node system in a next generation communication system.

Referring to FIG. 8, if an individual node operates as a part of antenna group of a cell in a manner that a controller manages transmission and reception of all nodes, it may correspond to a distributed multi node system (DMNS) that forms a single cell. In this case, each of the individual nodes may receive a separate node ID or may operate as a part of antenna within the cell without a separate Node ID. Yet, if nodes have a cell identifier (ID) different from each other, it may correspond to a multi-cell system. If a multi cell is configured by a duplicated form according to coverage, this is called a multi-tier network.

Meanwhile, a Node-B, an eNode-B, a PeNB, a HeNB, an RRH (remote radio head), a relay, a distributed antenna, and the like may become a node and at least one antenna is installed in a node. A node is also called a transmission point. In general, a node indicates an antenna group apart from each other more than a prescribed space, the present invention defines and applies a node as a random antenna group irrespective of a space.

With the help of the introduction of the aforementioned multi-node system and a relay node, application of various communication schemes is enabled and channel quality enhancement can be performed. Yet, in order to apply the aforementioned MIMO scheme and inter-cell cooperation communication scheme to a multi-node environment, an introduction of a new control channel is required. To this end, a control channel considered as the newly introduced control channel, which corresponds to an E-PDCCH (enhanced-PDCCH), is under discussion. This channel is determined to be assigned to a data region (hereinafter described as PDSCH region) instead of a legacy control region (hereinafter described as PDCCH region). Consequently, control information on a node can be transmitted according to each UE via the E-PDCCH. Hence, a problem of shortage of the legacy PDCCH region can be solved as well. For reference, the E-PDCCH is not provided to a legacy UE. Instead, an LTE-A UE can receive the E-PDCCH only. And, transmission/reception of the E-PDCCH is performed based on a DM-RS (or CSI-RS) instead of a CRS corresponding to a legacy cell-specific reference signal.

Figure 9:
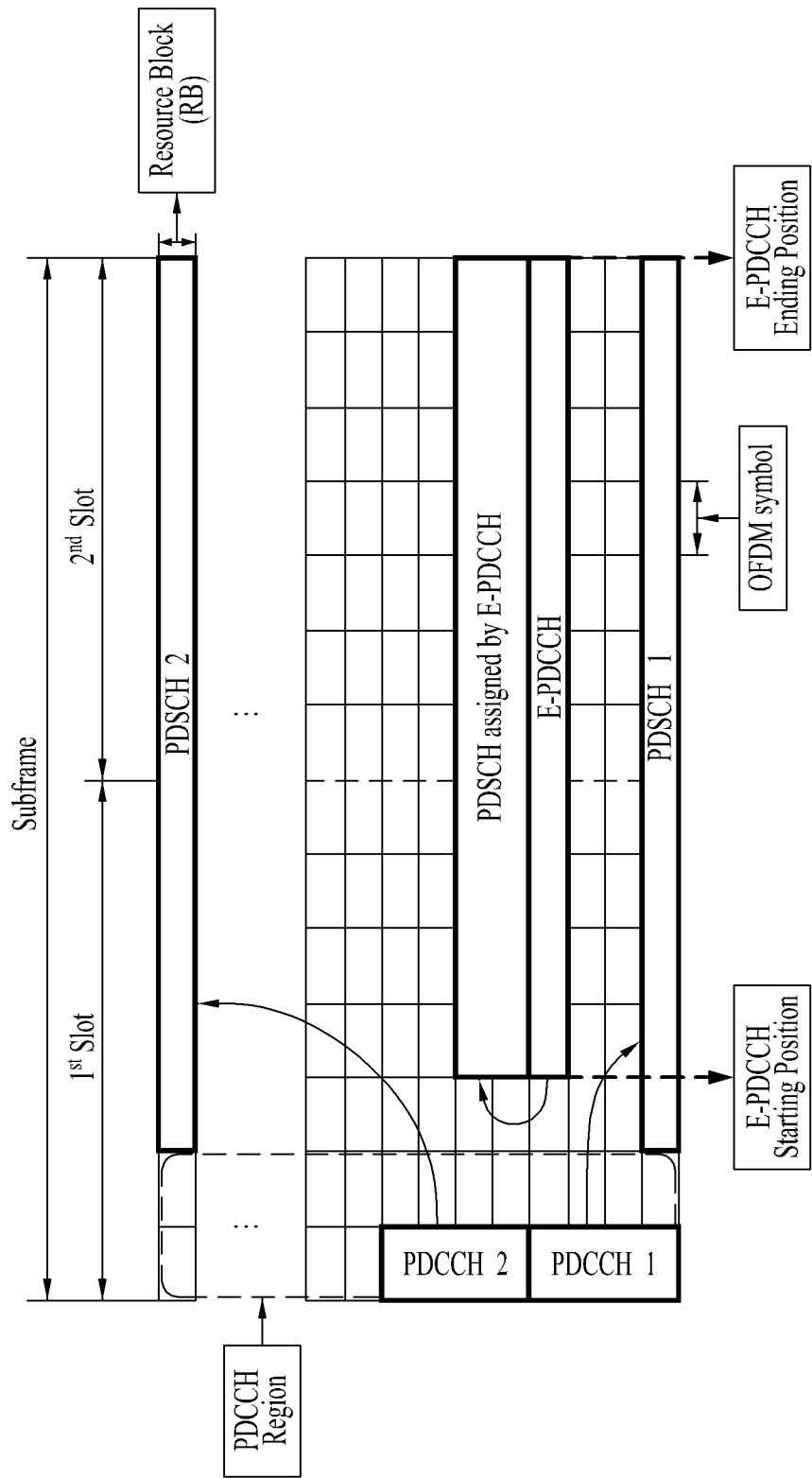
FIG. 9 is a diagram for an example of E-PDCCH explained in the present invention and PDSCH scheduled by the E-PDCCH.

FIG. 9 is a diagram for an example of E-PDCCH explained in the present invention and PDSCH scheduled by the E-PDCCH.

Referring to FIG. 9, PDCCH 1 schedules PDSCH 1, PDCCH 2 schedules PDSCH 2 and E-PDCCH schedules a different PDSCH. In particular, FIG. 9 shows that the E-PDCCH is transmitted from a fourth symbol to the last symbol in a subframe.

In general, E-PDCCH can be transmitted via a PDSCH region carrying data and a user equipment should perform a process of blind decoding on a search space for E-PDCCH to detect whether there exist E-PDCCH of the user equipment.

Although E-PDCCH performs a scheduling operation (i.e., PDSCH, PUSCH control) identical to a scheduling operation of a legacy PDCCH, if the number of user equipments, which have accessed such a node as an RRH, increases, greater number of E-PDCCHs are assigned to the inside of the PDSCH region. As a result, the number of blind decoding performed by the user equipment increases and complexity may be getting higher.

As mentioned in the foregoing description, E-PDCCH can be transmitted in the PDSCH region instead of the legacy PDCCH or together with the legacy PDCCH. In this case, the PDSCH region is defined as a region consisting of remaining OFDM symbols except a part of initial OFDM symbols used for the purpose of PDCCH in a subframe including a plurality of OFDM symbols. Of course, all OFDM symbols in a corresponding subframe can be used as the PDSCH region since there does not exist any OFDM symbol used for the purpose of PDCCH. And, it is apparent that E-PDCCH described in the following is used by an eNode B to perform a communication with not only a normal user equipment but also a relay.

In order to detect E-PDCCH, a user equipment should be aware of a region in which a blind decoding is performed, i.e., location information of a search space. In this case, a search space for E-PDCCH may correspond to a UE-specific search space configured for a common search space shared by all UEs in a cell or a UE-specific search space configured for a specific UE. The search space for E-PDCCH can be demodulated based on a predetermined specific RS (e.g., DM-RS or a CSI-RS) and a user equipment is able to aware of antenna port configuration information of the specific RS, which is used for demodulating the search space, via a predetermined rule or upper layer signaling (or physical layer signaling).

The present invention explained in the following description proposes a method of efficiently configuring and managing location information of a search space for E-PDCCH. Moreover, the present invention also proposes a method of efficiently managing E-PHICH (enhanced PHICH) and E-PCFICH (enhanced PCFICH), which are capable of being transmitted in a legacy PDSCH region instead of a legacy PHICH and PCFICH, together with E-PDCCH. In this case, similar to the legacy PCFICH, the E-PCFICH can be used to indicate a resource location of the UE-specific search space for the E-PDCCH and the amount of the resource. For instance, the E-PCFICH can be used to indicate a location of a starting symbol of the UE-specific search space for the E-PDCCH and/or the amount of a frequency resource of the UE-specific search space for the E-PDCCH. And, similar to the legacy PHICH, the E-PHICH can be used by an eNode B to inform a UE of ACK/NACK signal in response to (E-) PDSCH transmission based on the E-PDCCH (or PDCCH). Of course, the E-PCFICH can also be used to indicate a resource location of a common search space for the E-PDCCH and the amount of the resource.

The E-PHICH and the E-PCFICH can be demodulated based on antenna port configuration identical to antenna port configuration information (e.g., an antenna port index, the number of antenna port and the like) of an RS used for demodulating the E-PDCCH. Or, the E-PHICH and the E-PCFICH can be demodulated based on antenna port configuration of an identical or different RS configured by a predetermined rule or upper layer signaling or physical layer signaling.

Embodiment 1

First of all, it may consider that a starting symbol of a common search space for E-PDCCH is fixed in all subframes.

Additionally, a location of the starting symbol can be configured to be changed according to a threshold value of a predetermined downlink system bandwidth. For instance, if the downlink system bandwidth is greater than a predetermined threshold value (X MHz), the location of the starting symbol of the common search space for the E-PDCCH can be configured by a fourth OFDM symbol. If the downlink system bandwidth is less than or equal to the predetermined threshold value (X MHz), the location of the starting symbol of the common search space for the E-PDCCH can be configured by a fifth OFDM symbol. Moreover, since the threshold value of the downlink system bandwidth can be configured by one or two or more values, the location of the starting symbol can be appropriately configured according to the number of the threshold value.

Of course, in order to always secure a size of the common search space for the E-PDCCH, the location of the starting symbol of the common search space and the like irrespective of configuration of a subframe in which the E-PDCCH is transmitted or a type and location of external interference (e.g., interference of PDCCH) on the subframe in which the E-PDCCH is transmitted, the location of the starting symbol can be configured by a symbol situating at a relatively latter part of the subframe.

Embodiment 2

In general, a CRS is transmitted in a PDCCH region only in a subframe configured as an MBSFN (multicast broadcast single frequency network). The number of OFDM symbol, which is used for the purpose of PDCCH, is differently defined according to a configuration of the number of antenna port of the CRS. And, the PDCCH region used in the MBSFN subframe can be configured by a relatively less number of OFDM symbols compared to a PDCCH region used in a non-MBSFN subframe (or normal SF).

Based on this, according to a second embodiment of the present invention, a starting symbol of a common search space for E-PDCCH can be configured to have a different location according to whether a type of a subframe in which the E-PDCCH is transmitted corresponds to an MBSFN subframe.

For instance, if the subframe in which the E-PDCCH is transmitted corresponds to an MBSFN subframe, the location of the starting symbol of the common search space for the E-PDCCH is configured by a third OFDM symbol. If the subframe in which the E-PDCCH is transmitted corresponds to a non-MBSFN subframe, the location of the starting symbol of the common search space for the E-PDCCH can be configured by a fourth OFDM symbol.

In addition, a PDCCH region is differently configured in the MBSFN subframe according to configuration of the number of antenna port of a CRS. Based on this, it may be able to differently define the location of the starting symbol of the common search space for the E-PDCCH in the MBSFN subframe according to the configuration of the number of antenna port of the CRS transmitted in the PDCCH region of the MBSFN subframe.

Additionally, it may be able to configure a rule of making the location of the starting symbol of the common search space for the E-PDCCH to be differently applied according to a threshold value of a predetermined downlink system bandwidth. Moreover, since the threshold value of the downlink system bandwidth can be configured by one or two or more values, the location of the starting symbol can be appropriately configured according to the number of threshold value.

Embodiment 3

A PDCCH region used in a special subframe of LTE TDD system is configured with a relatively less number of OFDM symbols compared to a PDCCH region used in a non-special subframe (or, normal subframe).

Hence, in case of the LTE TDD system, a location of a starting symbol of a common search space for E-PDCCH can be differently defined according to whether a subframe in which the E-PDCCH is transmitted corresponds to a special subframe. In particular, the location of the starting symbol of the common search space for E-PDCCH in the special subframe can be defined by a symbol situating at a relatively more front part compared to a normal subframe.

Additionally, it may be able to configure a rule of making the location of the starting symbol of the common search space for the E-PDCCH to be differently applied according to a threshold value of a predetermined downlink system bandwidth. Moreover, since the threshold value of the downlink system bandwidth can be configured by one or two or more values, the location of the starting symbol can be appropriately configured according to the number of threshold value.

Embodiment 4

It is able to determine a rule of making a location of a starting symbol of a common search space for E-PDCCH to be differently defined according to a characteristic of an RS transmitted in a subframe.

For instance, a PRS (positioning reference signal) can be transmitted in RB(s) only of a downlink subframe predetermined to transmit the PRS. And, the PRS is applied only when a subcarrier space (Δf) corresponds to 15 kHz. If both a normal subframe and an MBSFN subframe are configured to transmit the PRS in a cell or a component carrier, OFDM symbols configured to transmit the PRS in the MBSFN subframe should use a CP identical to a CP used in a subframe index #0. And, if the MBSFN subframe is configured only to transmit the PRS, the OFDM symbols configured to transmit the PRS should use an extended CP. Moreover, if length of a CP is identical to each other in subframes configured to transmit the PRS, a starting symbol for PRS mapping is identical to each other.

And, an RE of the PRS may be overlapped with an RE of a DM-RS, which is used in case of demodulating E-PDCCH. In this case, the E-PDCCH cannot be transmitted in an RB resource region (i.e., a corresponding PRB pair) to which the PRB is transmitted. Based on this, it is necessary to change a location of a starting symbol of a common search space for the E-PDCCH. Moreover, the PRS cannot be transmitted in a special subframe.

Hence, according to the fourth embodiment of the present invention, the location of the starting symbol of the common search space for the E-PDCCH can be differently configured according to whether the PRS is transmitted in a specific subframe (e.g., a normal downlink subframe except a special subframe), i.e., according to whether a subframe corresponds to a subframe in which the PRS is transmitted.

More specifically, since a part of predetermined PRB pairs related to the E-PDCCH cannot be used for transmitting the E-PDCCH due to the PRS transmission, the location of the starting symbol of the common search space for the E-PDCCH can be defined by a symbol situating at a relatively more front part in the subframe to which the PRS is transmitted compared to a subframe to which the PRS is not transmitted. By doing so, it is able to sufficiently secure the amount of resource used for transmitting the E-PDCCH in the subframe to which the PRS is transmitted. In addition, it may be able to configure a rule of making the location of the starting symbol of the common search space for the E-PDCCH to be differently applied according to a threshold value of a predetermined downlink system bandwidth. Moreover, since the threshold value of the downlink system bandwidth can be configured by one or two or more values, the location of the starting symbol can be appropriately configured according to the number of threshold value.

Embodiment 5

And, it is able to configure the location of the starting symbol of the common search space for the E-PDCCH via upper layer signaling (e.g., RRC layer signaling). Of course, it may be able to configure a rule of making the location of the starting symbol of the common search space for the E-PDCCH to be differently applied according to a threshold value of a predetermined downlink system bandwidth. Moreover, since the threshold value of the downlink system bandwidth can be configured by one or two or more values, the location of the starting symbol can be appropriately configured according to the number of threshold value.

When the location of the starting symbol of the common search space for the E-PDCCH is configured via the upper layer signaling according to the fifth embodiment, there may exist an ambiguity section from timing of the upper layer signaling to timing on which the location of the starting symbol is actually applied between an eNB and a UE. In order to solve the above-mentioned problem, the eNB and the UE can share the location of the starting symbol of the common search space for the E-PDCCH in advance for the purpose of default or fallback. For instance, the eNB and the UE considers a first OFDM symbol after a legacy PDCCH region, a first OFDM symbol of a subframe in case of not transmitting the legacy PDCCH or an OFDM symbol of a predetermined specific location as the location of the starting symbol of the common search space for the E-PDCCH, which is used for the purpose of default or fallback, and may be then able to perform E-PDCCH reception operation.

Embodiment 6

The aforementioned E-PCFICH or the E-PHICH can be multiplexed together with the E-PDCCH in a PRB-pair where all or a part of the common search space for the E-PDCCH or UE-specific search space is identical to each other. Hence, it is preferable to configure a location of a starting symbol of the E-PCFICH or the E-PHICH to be identical to the location of the starting symbol of the common search space (or, UE-specific search space) for the E-PDCCH.

Or, an eNB may independently inform a UE of the location of the starting symbol of the E-PCFICH or the E-PHICH via upper layer signaling or a physical layer signal. Or, the location of the starting symbol of the E-PCFICH or the E-PHICH can be defined by a fixed starting symbol location based on a predetermined rule.

Embodiment 7

As mentioned in the foregoing description, the E-PCFICH can indicates a UE-specific search space for the E-PDCCH, a resource location (e.g., a location of a starting symbol or an amount of a frequency resource) of a common search space or a location of a starting symbol of PDSCH scheduled by the E-PDCCH. Of course, the E-PCFICH can be multiplexed together with the E-PDCCH in the common search space for the E-PDCCH or a PRB-pair where all or a part of the common search space is identical to each other. Or, the E-PCFICH can be independently transmitted in a predetermined specific resource region.

In this case, a reference point for the location of the starting symbol, i.e., a first symbol defined as the starting symbol of the search space for the E-PDCCH indicated by the E-PCFICH, can be defined by i) a first OFDM symbol configuring a single subframe or ii) a first symbol after OFDM symbols used for transmitting legacy PDCCH. Or, the reference point for the location of the starting symbol can be defined by a reference point of a starting symbol of PDSCH scheduled by the E-PDCCH. And, at least one of a) the location of the starting symbol of the common search space for the E-PDCCH and b) a location of a starting symbol of a UE-specific search space for the E-PDCCH can be defined as the start symbol reference point of PDSCH scheduled by the E-PDCCH.

And, the UE-specific search space for the E-PDCCH, the common search space or the location of the start symbol of PDSCH scheduled by the E-PDCCH can be differently configured according to a threshold value of a predetermined downlink system bandwidth. Moreover, since the threshold value of the downlink system bandwidth can be configured by one or two or more values, the location of the starting symbol of the UE-specific search space for the E-PDCCH or the location of the starting symbol of the E-PDCCH-based PDSCH can be appropriately configured according to the number of the threshold value.

Or, the location of the starting symbol of the UE-specific search space for the E-PDCCH or the location of the starting symbol of the E-PDCCH-based PDSCH is considered as being identical to the location of the starting symbol of the common search space for the E-PDCCH. Or, the location of the starting symbol of the UE-specific search space for the E-PDCCH or the location of the starting symbol of the E-PDCCH-based PDSCH can be configured by an OFDM symbol of a predetermined specific location.

Meanwhile, in case of a special subframe of a LTE TDD system, since the number of OFDM symbols configuring DwPTS, which is used for downlink, in the special subframe is relatively less compared to a non-special subframe (or normal subframe), although E-CCE (enhanced CCE) as many as the non-special subframe (normal subframe) is required for configuring the UE-specific search space for the E-PDCCH, more frequency resources (e.g., more number of RBs) are required in the special subframe. In this case, the E-CCE indicates RE subsets into which a single PRB pair is divided according to a prescribed rule. E-PDCCH (or E-PHICH, E-PCFICH) transmission is performed based on the E-CCE as a basic unit.

Hence, the present invention proposes a method of interpreting a value of a specific state of E-PCFICH as an amount (e.g., RB size) of frequency resource required for configuring the UE-specific search space (or the common search space) for the E-PDCCH. The amount of the frequency resource can be differently interpreted according to a subframe characteristic. For instance, a value 'n' of the specific state of the E-PCFICH indicates that 'n*K' number of RB(s) are allocated to configure the UE-specific search space (or the common search space) for the E-PDCCH. In this case, the 'K' can be defined by the number of RBs from which the N number of E-CCE is extracted, which is necessary for configuring the UE-specific search space (or the common search space) for the E-PDCCH. And, the 'K' can also be defined by the number of RBs capable of configuring N number of E-CCEs under a given subframe characteristic.

An eNB can inform a UE of whether to apply the seventh embodiment via upper layer signaling or physical layer signaling.

Additionally, as indicator (or parameter) information capable of being added to the E-PCFICH, the eNB can inform the UE of a radio resource determination scheme (e.g., resource hopping methods) used by PUCCH or PUSCH. For instance, when the eNB informs the UE of the radio resource determination scheme used by PUSCH, information indicating contents identical (or modified content) to all or a part of a PUSCH hopping type 1 and a PUSCH hopping type 2 can be transmitted to the UE in an indicator form in a manner of being added to the E-PCFICH.

Or, if all or a part of a radio resource determination scheme used by PUCCH such as a resource determination scheme of symbol/slot/subframe unit, a resource hopping pattern and the like is identically applied or is applied in a modified form, an indicator form indicating a part or all of related parameters can be transmitted in a manner of being added to the E-PCFICH. As an example of the aforementioned rule, there may exist a CS/OCC hopping pattern of a DM-RS, a slot unit PRB (physical resource block) hopping pattern and the like.

Moreover, the information of the indicator form, which is transmitted in a manner of being added to the E-PCFICH, can be differently interpreted according to a subframe characteristic or a threshold value of a predetermined downlink system bandwidth.

Embodiment 8

E-PCFICH may not be transmitted on an extension carrier, which is currently discussing, in environment to which a carrier aggregation (CA) technique is applied. When the E-PCFICH is configured not to be transmitted on the extension carrier, a corresponding radio resource, which was expected to transmit the E-PCFICH, can be configured to be used for transmitting a different channel (e.g., E-PHICH, a common search space for E-PDCCH, a UE-specific search space for the E-PDCCH, E-PDCCH-based PDSCH, PDCCH-based PDSCH or the like). And, when the E-PCFICH is configured not to be transmitted on the extension carrier, a corresponding radio resource, which was expected to transmit the E-PCFICH, can be configured to be used for transmitting a different channel (e.g., E-PHICH, a common search space for E-PDCCH, a UE-specific search space for the E-PDCCH, E-PDCCH-based PDSCH, PDCCH-based PDSCH or the like).

And, a location of a starting symbol of the common search space for the E-PDCCH, a location of a starting symbol of the UE-specific search space for the E-PDCCH, a starting symbol of the E-PDCCH-based PDSCH and the like can be configured based on the aforementioned embodiment 1 to embodiment 7, respectively.

For instance, since a legacy PDCCH may not be transmitted on the extension carrier, in this case, the location of the starting symbol of the common search space for the E-PDCCH, the location of the starting symbol of the UE-specific search space for the E-PDCCH, the location of the starting symbol of the E-PDCCH-based PDSCH and the like can be (always) implicitly considered as a first OFDM symbol of a subframe. Or, a location of a starting symbol configured via upper layer signaling (or a physical layer signal) can be used as well.

Of course, the common search space for the E-PDCCH, the UE-specific search space for the E-PDCCH, the location of the starting symbol of the E-PDCCH-based PDSCH, the location of the starting symbol of the E-PDCCH, the location of the starting symbol of the E-PHICH or the like can be defined to be differently configured according to a threshold value of a predetermined downlink system bandwidth. Moreover, since the threshold value of the downlink system bandwidth can be configured by one or two or more values, the location of the starting symbol can be appropriately configured according to the number of the threshold value.

An eNB can inform a UE of information, which is used for applying the embodiments proposed by the present invention including a threshold value, a location of a starting symbol of a common search space (or UE-specific search space) for E-PDCCH for the purpose of default or fall back, a starting symbol reference point and the like, and whether to apply a specific embodiment via upper layer signaling or a physical layer signal.

If whether to apply a specific rule or signaling configured to indicate a location of a starting symbol, which is proposed by the present invention, is not transmitted from an eNB, a UE may use a location of a starting symbol for the purpose of default or fallback. In this case, the location of the starting symbol for the purpose of default or fallback may correspond to a first OFDM symbol after a PDCCH region, a first OFDM symbol of a subframe in case of not transmitting PDCCH or an OFDM symbol of a predetermined specific location for example.

Moreover, the present invention can be applied to not only a case that an E-CCE, which is used for transmitting a single E-PDCCH, E-PHICH or E-PCFICH, is extracted from a single PRB pair for frequency localized transmission but also a case that the E-CCE is extracted from PRB pairs different from each other for frequency distributed transmission.

And, the present invention can be extensively applied to not only a case that one or a plurality of E-PDCCH-based component carriers (or cells) are used under environment to which a carrier aggregation technique is applied but also a case that the E-PDCCH-based component carrier (or cell) and a PDCCH-based component carrier (or cell) are used together. Of course, the present invention can be extensively applied when an extension carrier is implemented by an E-PDCCH based operation. And, the present invention can be extensively applied in case of performing device-to-device communication based on E-PDCCH.

Figure 10:
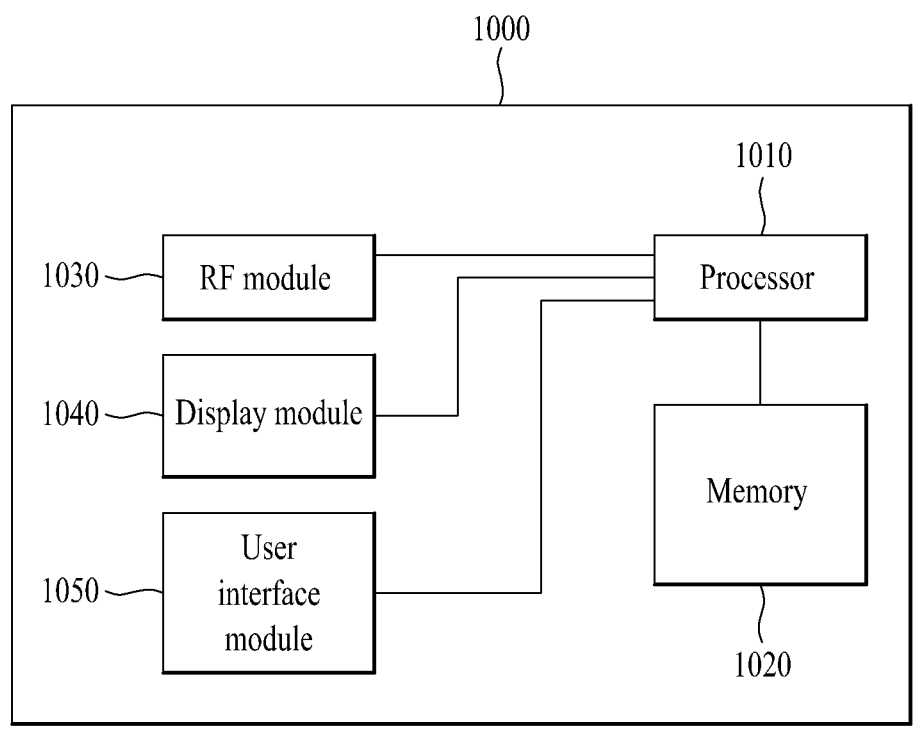
FIG. 10 is a block diagram for an example of a communication device according to embodiment of the present invention.

FIG. 10 is a block diagram for an example of a communication device according to embodiment of the present invention.

Referring to FIG. 10, a communication device 1000 may include a processor 1010, a memory 1020, an RF module 1030, a display module 1040, and a user interface module 1050.

Since the communication device 1000 is depicted for clarity of description, prescribed module(s) may be omitted in part. The communication device 1000 may further include necessary module(s). And, a prescribed module of the communication device 1000 may be divided into subdivided modules. A processor 1010 is configured to perform an operation according to the embodiments of the present invention illustrated with reference to drawings. In particular, the detailed operation of the processor 1010 may refer to the former contents described with reference to FIG. 1 to FIG. 9.

The memory 1020 is connected with the processor 1010 and stores an operating system, applications, program codes, data, and the like. The RF module 1030 is connected with the processor 1010 and then performs a function of converting a baseband signal to a radio signal or a function of converting a radio signal to a baseband signal. To this end, the RF module 1030 performs an analog conversion, amplification, a filtering, and a frequency up conversion, or performs processes inverse to the former processes. The display module 1040 is connected with the processor 1010 and displays various kinds of information. And, the display module 1040 can be implemented using such a well-known component as an LCD (liquid crystal display), an LED (light emitting diode), an OLED (organic light emitting diode) display and the like, by which the present invention may be non-limited. The user interface module 1050 is connected with the processor 1010 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of setting a search space to detect a downlink control channel in a wireless communication system and an apparatus therefor are described with reference to examples applied to 3GPP LTE system, it may be applicable to various kinds of wireless communication systems as well as the 3GPP LTE system.

What is claimed is:

1. A method of setting a search space, which is set by a user equipment (UE) to detect a downlink control channel in a wireless communication system, the method comprising:

receiving information on a starting symbol of the search space for an enhanced downlink control channel in a data region of a subframe from an epode B; and monitoring the enhanced downlink control channel by performing blind decoding on the search space which is set using the information on the starting symbol, wherein, when a downlink bandwidth assigned to the UE is greater than a threshold value, the starting symbol of the search space is determined as a symbol having an index #n indicated by the information on the starting symbol, and wherein, when the downlink bandwidth is smaller than the threshold value, the starting symbol of the search space is determined as a symbol having an index #n+1.

2. The method according to claim 1, wherein if the subframe corresponds to a multicast broadcast single frequency network (MBSFN) subframe, the starting symbol of the search space is located more toward a front end of the starting symbol of the search space compared to a case in which the subframe corresponds to a non-MBSFN subframe.

3. The method according to claim 2, wherein if the subframe corresponds to the MBSFN subframe, the starting symbol of the search space changes according to the number of an antenna port of a cell-specific reference signal received in the subframe.

4. The method according to claim 1, further comprising:
receiving a control format indicator channel containing information on the number of a resource block in which the search space is configured from the eNode B.

5. The method according to claim 1, Wherein the starting symbol of the search space changes according to whether a positioning reference signal is transmitted in the subframe.

6. The method according to claim 1, wherein the search space is configured from the starting symbol to a last symbol of the subframe.

7. The method according to claim 1, wherein the starting symbol of the search space changes according to the number of a symbol configured for the purpose of downlink in the subframe.

8. The method according to claim 1, wherein if the subframe is received on an extension carrier where a legacy downlink control channel is not received, the starting symbol of the search space is configured by a first symbol of the subframe.

9. The method according to claim 1, wherein the downlink control channel is demodulated using a UE-specific reference signal.

10. The method according to claim 1, wherein the information on the starting symbol is transmitted via physical layer signaling.

11. A user equipment in a wireless communication system, the user equipment comprising:

a receiver configured to receive information on a starting symbol of a search space for an enhanced downlink control channel in a data region of a subframe from an eNode B; and a processor configured to monitor the enhanced downlink control channel by performing blind decoding on the search space which is set using the information on the starting symbol, wherein, when a downlink bandwidth assigned to the user equipment is greater than a threshold value, the starting symbol of the search space is determined as a symbol having an index #n indicated by the information on the starting symbol, and wherein, when the downlink bandwidth is smaller than the threshold value, the starting symbol of the search space is determined as a symbol having an index #n+1.

* * * * *